United States Patent
Marupaduga (10) Patent No.: US 11,234,118 B1
(45) Date of Patent: Jan. 25, 2022

(54) MULTIPLE INPUT MULTIPLE OUTPUT (MIMO) LAYER CONTROL FOR WIRELESS USER EQUIPMENT

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/014,304

(22) Filed: Sep. 8, 2020

(51) Int. Cl.
*H04W 8/20* (2009.01)
*H04B 7/0456* (2017.01)
*H04W 76/27* (2018.01)
*H04B 7/0452* (2017.01)
*H04W 8/24* (2009.01)
*H04W 88/14* (2009.01)

(52) U.S. Cl.
CPC ............ *H04W 8/20* (2013.01); *H04B 7/0452* (2013.01); *H04B 7/0456* (2013.01); *H04W 8/24* (2013.01); *H04W 76/27* (2018.02); *H04W 88/14* (2013.01)

(58) Field of Classification Search
CPC ....... H04W 8/20; H04W 88/14; H04W 76/27; H04W 8/24; H04B 7/0456; H04B 7/0452
See application file for complete search history.

(56) References Cited

U.S. PATENT DOCUMENTS

| 8,385,246 | B2 | 2/2013 | Sawahashi et al. | |
| 8,891,461 | B2 | 11/2014 | Xiao et al. | |
| 9,112,552 | B2 | 8/2015 | Ko et al. | |
| 9,236,985 | B2 | 1/2016 | Chen et al. | |
| 9,648,588 | B2 | 5/2017 | Kim et al. | |
| 2011/0142147 | A1 | 6/2011 | Chen et al. | |
| 2016/0081076 | A1* | 3/2016 | Zhang | H04W 72/0446 370/336 |
| 2016/0359647 | A1 | 12/2016 | Chen et al. | |
| 2018/0205438 | A1* | 7/2018 | Davydov | H04B 7/0469 |
| 2019/0319765 | A1* | 10/2019 | Mghazli | H04B 7/0413 |
| 2021/0050886 | A1* | 2/2021 | Lee | H04L 5/0005 |
| 2021/0105108 | A1* | 4/2021 | Abdelghaffar | H04L 5/0092 |

* cited by examiner

*Primary Examiner* — Afshawn M Towfighi
(74) *Attorney, Agent, or Firm* — Setter Roche Smith & Shellenberger LLP (57) ABSTRACT

A wireless access node controls Multiple Input Multiple Output (MIMO) layers for a User Equipment (UE). A radio wirelessly exchanges user data with other UEs and exchanges the user data with baseband circuitry. The baseband circuitry exchanges the user data with network elements over backhaul links. The baseband circuitry determines a status of the backhaul links. The baseband circuitry identifies the radio band status for the UE. The baseband circuitry receives user data for the UE from the network elements over the backhaul links. The baseband circuitry selects a number of MIMO layers for the UE based on the radio band status and the backhaul status. The baseband circuitry precodes the user data into precoded data for the selected number of MIMO layers and transfers the precoded data to the radio. The radio wirelessly transmits the precoded data to the UE over the selected number of MIMO layers.

20 Claims, 7 Drawing Sheets

MULTIPLE INPUT MULTIPLE OUTPUT (MIMO) LAYER CONTROL FOR WIRELESS USER EQUIPMENT

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices using wireless network protocols. Exemplary wireless network protocols include Fifth Generation New Radio (5GNR), Millimeter Wave (mmW), Long Term Evolution (LTE), Institute of Electrical and Electronic Engineers (IEEE) 802.11 (WIFI), and Low-Power Wide Area Network (LP-WAN).

The wireless user devices have various characteristics. The wireless user devices have radio band characteristics like signal strength and quality that characterize their wireless connections to the wireless access nodes. The wireless user devices may have emergency status when users calls 911 or the like. The wireless user devices may have relay status when the wireless user device accepts wireless attachments of other wireless user devices and then wirelessly couples the attached user devices to the wireless access nodes. The wireless user devices may have capabilities for 5GNR or mmW. The wireless user devices may be mobile or stationary. The wireless access nodes also have characteristics. The wireless access nodes have backhaul status that characterizes their connections to core data communication networks. The wireless access node have error rates that characterizes their communication performance with the wireless user devices. The wireless access nodes have other characteristics like user device loads and uplink noise rises.

The wireless access nodes and the wireless user devices use Multiple Input Multiple Output (MIMO) to optimize their wireless communications. MIMO precodes data into independent data layers for parallel wireless transmission. MIMO precoding comprises digital beamforming by the physical layer to maintain isolation between the MIMO data layers. Wireless reliability is improved when different MIMO layers carry redundant data to increase multipath transmit diversity. Wireless data rate is improved when the MIMO layers carry different data that is isolated by spatial multiplexing. The wireless access nodes control the number of MIMO layers for a UE based on frequency band characteristics like signal strength and quality. Unfortunately, the wireless access nodes do not efficiently and effectively optimize the number of MIMO layers for a UE based a larger set of characteristics for the wireless user devices and the wireless access nodes.

TECHNICAL OVERVIEW

A wireless access node controls Multiple Input Multiple Output (MIMO) layers for a User Equipment (UE). A radio in a wireless access node wirelessly exchanges user data with other UEs and exchanges the user data with baseband circuitry. The baseband circuitry exchanges the user data with network elements over backhaul links. The baseband circuitry determines the status of the backhaul links. The baseband circuitry identifies the radio band status for the UE. The baseband circuitry receives user data for the UE from the network elements over the backhaul links. The baseband circuitry selects a number of MIMO layers for the UE based on the radio band status and the backhaul status. The baseband circuitry precodes the user data into precoded data for the selected number of MIMO layers and transfers the precoded data to the radio. The radio wirelessly transmits the precoded data over the selected number of MIMO layers to the UE.

DETAILED DESCRIPTION

Figure 1:
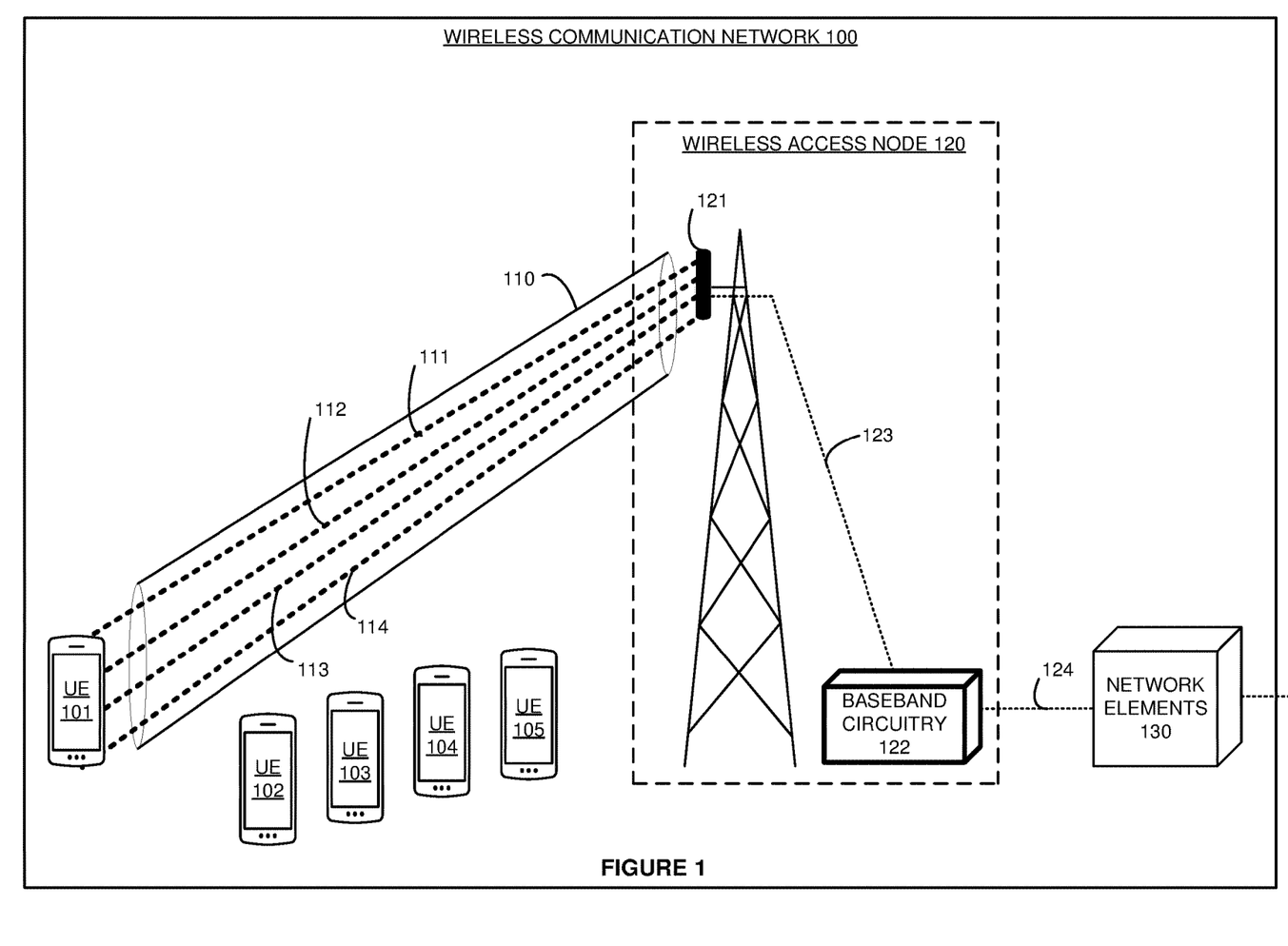
FIG. 1 illustrates a wireless communication network to control the amount of Multiple Input Multiple Output (MIMO) layers for a User Equipment (UE).

FIG. 1 illustrates wireless communication network 100 to control the amount of Multiple Input Multiple Output (MIMO) layers for User Equipment (UE) 101. Wireless communication network 100 delivers wireless data services like internet-access, video-calling, media-streaming, augmented-reality, machine-control, and/or some other wireless networking product. Wireless communication network 100 comprises wireless UEs 101-105, wireless access node 120, and network elements 130. Wireless access node 120 comprises radio 121 and baseband circuitry 122. UE 101 is wirelessly linked to wireless access node 120 over radio band 110 by MIMO layers 111-114. UEs 102-105 are wirelessly linked to wireless access node 120 over wireless links that are not shown for clarity. The number of UEs and access nodes on FIG. 1 has been restricted for clarity, and wireless communication network 100 typically has more UEs and access nodes than that shown.

Various examples of network operation and configuration are described herein. In some examples, UEs 102-105 and radio 121 wirelessly exchange user data over wireless links (not shown). Radio 121 and baseband circuitry 122 exchange the user data over interface links 123. Baseband circuitry 122 and network elements 130 exchange the user data over backhaul links 124. Network elements 130 may exchange the user data with external systems like the internet, enterprise networks, or some other data systems. Baseband circuitry 122 determines the backhaul status of backhaul links 124. Backhaul status may indicate average throughput, percent-of-capacity, latency, and/or the like. Contemporaneously, baseband circuitry 122 receives user data for UE 101 from network elements 130 over backhaul links 124. UE 101 determines band status for radio band 110 and transfers the band status to baseband circuitry 122 over radio 121. Baseband circuitry 122 selects the number of MIMO layers for UE 101 based on the band status, backhaul status, and possibly additional factors. In this example, baseband circuitry 122 selects four MIMO layers 111-114, although different numbers of layers are typically selected over time. Baseband circuitry 122 precodes the user data for the selected number of MIMO layers for UE 101. Baseband circuitry 122 transfers precoded data to radio 121 over interface links 123. Radio 121 wirelessly transmits the precoded data to UE 101 over selected MIMO layers 111-114.

UE 101 has radio band characteristics like signal strength and quality that characterize radio band 110. UE 101 may have an emergency status when the user calls/texts to 911 or another emergency code. UE 101 may have a relay status when UE 101 accepts the wireless attachments of other UEs and wirelessly couples these UEs to wireless access node 120. UE 101 may have the capability to use advanced wireless technologies like 5GNR and mmW. UE 101 may be mobile or stationary. UE 101 may have a Multiple User MIMO (MU-MIMO) status where it shares the same time/frequency resources with other UEs. For example, MIMO layers 111-114 may comprise a subset of 16 total MIMO layers that are transmitted by wireless access node 120 and that are shared by UEs 101-104 at four layers per UE.

Wireless access node 120 has backhaul status that characterizes the performance of backhaul links 124. Wireless access node 120 has an error rate that characterizes the communication performance of radio band 110. Wireless access node 120 has user loads like the number of Radio Resource Control (RRC) connected UEs. Wireless access node 120 has a varying uplink noise rise which comprises the total interference power divided by the background noise power.

Baseband circuitry 122 may use at least some of the additional characteristics to select the amount of MIMO layers for UE 101. For UE 101, baseband circuitry 122 may determine emergency status, Multiple User MIMO (MU-MIMO) status, UE capabilities, relay status, mobility factor, and/or some other data. For wireless access node 120, baseband circuitry 122 may determine uplink noise rise, downlink error rate, RRC-Connected UE load, and/or some other data. Baseband circuitry 122 may process one or more of these additional factors in combination with band/backhaul status to select the number of MIMO layers for UE 101. Baseband circuitry 122 decreases the amount of MIMO layers in response to: decreased band quality, decreased backhaul quality, increased uplink noise rise, increased UE load, increased downlink error rate, non-emergency status, Single-User (SU) MIMO status, non-relay status, legacy UE capabilities, and increased UE mobility. Baseband circuitry 122 increases the amount of MIMO layers in response to: increased band quality, increased backhaul quality, decreased uplink noise rise, decreased UE load, decreased downlink error rate, emergency status, Multiple-User (MU) MIMO status, relay status, advanced UE capabilities, and decreased UE mobility. In some scenarios, the changes to some factors offset the changes to other factors as multiple factors are processed in combination to select the amount of MIMO layers for UE 101. Advantageously, wireless access node 120 optimizes downlink wireless communications for UE 101 by efficiently and effectively controlling the number of MIMO layers based a potentially large set of characteristics for UE 101 and wireless access node 120.

UEs 101-105 wirelessly communicate with wireless access node 110 over radio band 110 using Radio Access Technologies (RATs) like Fifth Generation New Radio (5GNR), millimeter Wave (mmW), Long Term Evolution (LTE), Institute of Electrical and Electronic Engineers (IEEE) 802.11 (WIFI), Low-Power Wide Area Network (LP-WAN), and/or some other wireless protocol. Radio band 110 uses electromagnetic frequencies in the low-band, mid-band, high-band, or some other portion of the electromagnetic spectrum. Links 123-124 use metal, glass, air, or some other media. Links 123-124 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although UEs 101-105 are depicted as smartphones, UEs 101-105 might instead comprise computers, robots, vehicles, or some other data appliances with wireless communication circuitry. Radio 121 is depicted on a tower, but radio 121 may use other mounting structures or no mounting structure at all. Wireless access node 110 may comprise gNodeBs, eNodeBs, hot-spots, base-stations, and/or some other form of wireless network transceiver. Network elements 130 comprise Access and Mobility Management Functions (AMFs), User Plane Functions (UPFs), millimeter wave controllers, Mobility Management Entities (MMEs), Gateways (GWs), Internet-of-Things (IoT) application servers, Internet Protocol Multimedia Subsystem (IMS) servers, and/or some other form of wireless network apparatus. In some examples, network elements 130 comprise Virtual Network Functions (VNFs) in a Network Function Virtualization Infrastructure (NFVI).

UEs 101-105 and radio 121 comprise antennas, amplifiers, filters, modulation, analog/digital interfaces, microprocessors, software, memories, transceivers, bus circuitry, and the like. Baseband circuitry 122 and network elements 130 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, network applications, and management applications. The microprocessors retrieve the software from the memories and execute the software to drive the operation of wireless communication network 100 as described herein.

Figure 2:
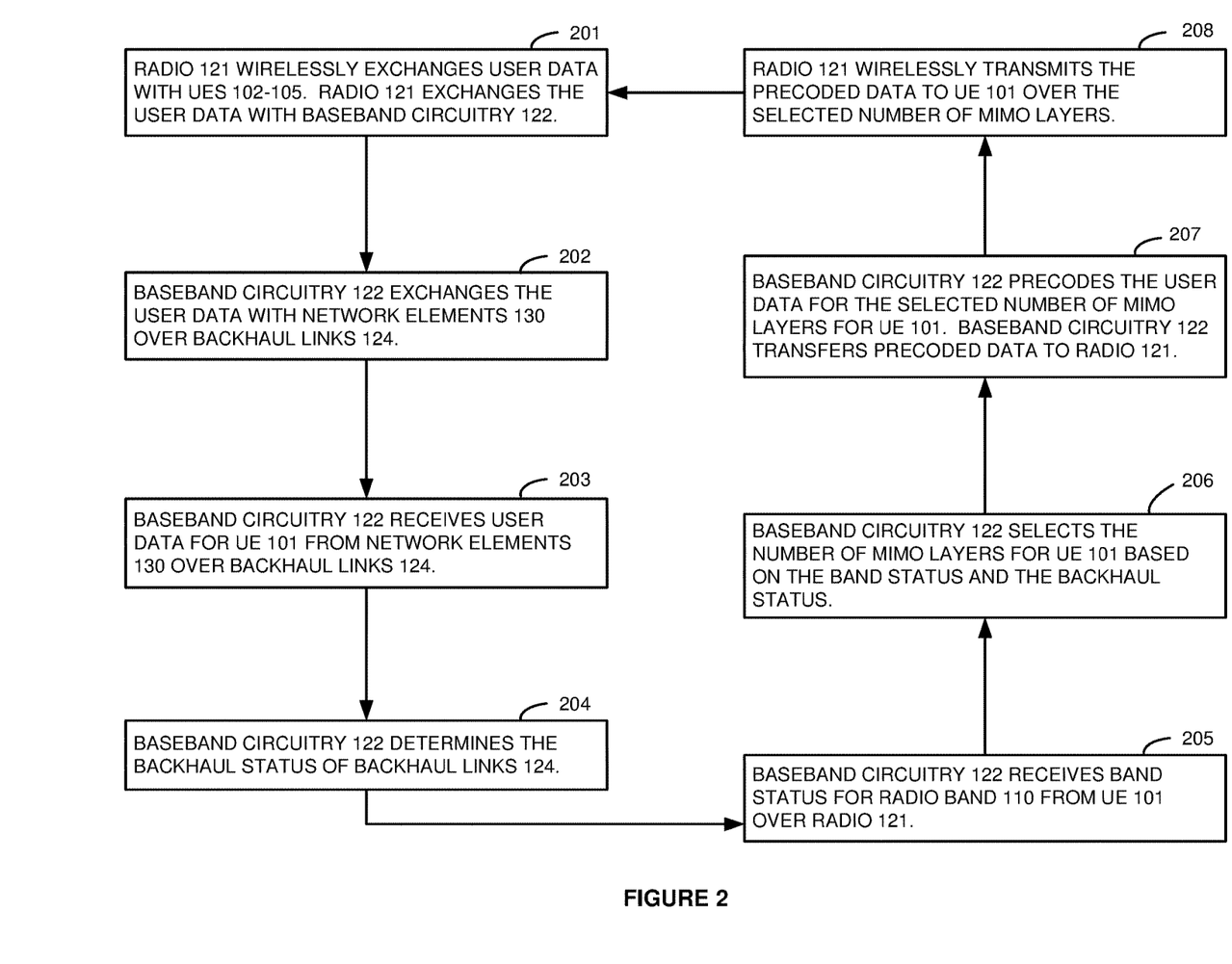
FIG. 2 illustrates an exemplary operation of the wireless communication network to control the amount of MIMO layers for the UE.

FIG. 2 illustrates an exemplary operation of wireless communication network 100 to control the amount of MIMO layers for UE 101. The illustrated operation may vary from FIG. 2 in other examples. Radio 121 wirelessly exchanges user data with UEs 102-105 and exchanges the user data with baseband circuitry 122 (201). Baseband circuitry 122 exchanges the user data with network elements 130 over backhaul links 124 (202). Baseband circuitry 122 receives user data for UE 101 from network elements 130 over backhaul links 124 (203). Baseband circuitry 122 determines the backhaul status of backhaul links 124 (204). Baseband circuitry 122 receives band status for radio band 110 from UE 101 over radio 121 (205). Baseband circuitry 122 selects the number of MIMO layers for UE 101 based on the band status and the backhaul status (206). Baseband circuitry 122 selects a high number of MIMO layers when band quality and backhaul quality are relatively high. Baseband circuitry 122 selects a low number of MIMO layers when band quality and backhaul quality are relatively low. Baseband circuitry 122 selects a medium number of MIMO layers when band quality and backhaul quality are near the middle or offset one another. Good backhaul quality and poor band quality tend to offset, as do poor backhaul quality and good band quality. Baseband circuitry 122 precodes the user data for the selected number of MIMO layers for UE 101 and transfers precoded data to radio 121 (207). Radio 121 wirelessly transmits the precoded data to UE 101 over the selected number of MIMO layers (208). The operation repeats (201).

Figure 3:
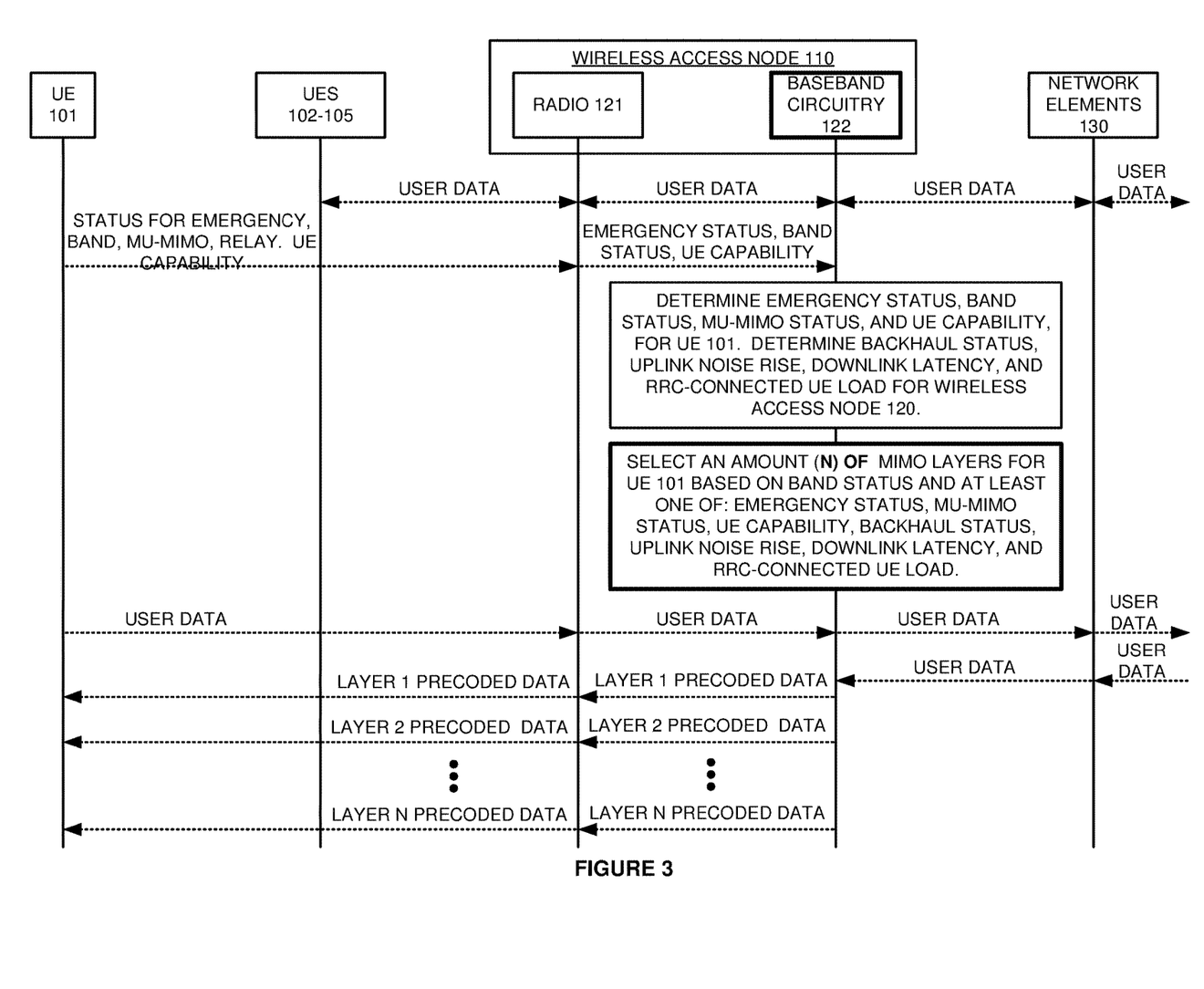
FIG. 3 illustrates another exemplary operation of the wireless communication network to control the amount of MIMO layers for the UE.

FIG. 3 illustrates another exemplary operation of wireless communication network 100 to control the amount of MIMO layers for UE 101. The illustrated operation may vary from FIG. 3 in other examples. UEs 102-105 and radio 121 wirelessly exchange user data. Radio 121 and baseband circuitry 122 exchange the user data. Baseband circuitry 122 and network elements 130 exchange the user data. Network elements 130 exchange the user data with external systems. UE 101 transfers signaling to radio 121 that indicates emergency status, band status, and UE capabilities. Radio 121 transfers the signaling to baseband circuitry 122. For UE 101, baseband circuitry 122 determines emergency status, band status, UE capabilities, and MU-MIMO status. For wireless access node 120, baseband circuitry 122 determines backhaul status, uplink noise rise, downlink error rate, and RRC-Connected UE load.

Baseband circuitry 122 selects an amount of MIMO layers for UE 101 based on the band status and at least one of: emergency status, MU-MIMO status, UE capabilities, backhaul status, uplink noise rise, downlink error rate, and RRC-Connected UE load. For the uplink, UE 101 wirelessly transfers user data to radio 121, and radio 121 transfers the user data to baseband circuitry 122. Baseband circuitry 122 transfers the user data to network elements 130, and network elements 130 transfer the user data to external systems. For the downlink, network elements 130 receive user data from the external systems and transfer the user data to baseband circuitry 122. Baseband circuitry 122 precodes the user data for the selected number of MIMO layers for UE 101. Baseband circuitry 122 transfers precoded data to radio 121. Radio 121 wirelessly transmits the precoded data to UE 101 over the selected number of MIMO layers.

Figure 4:
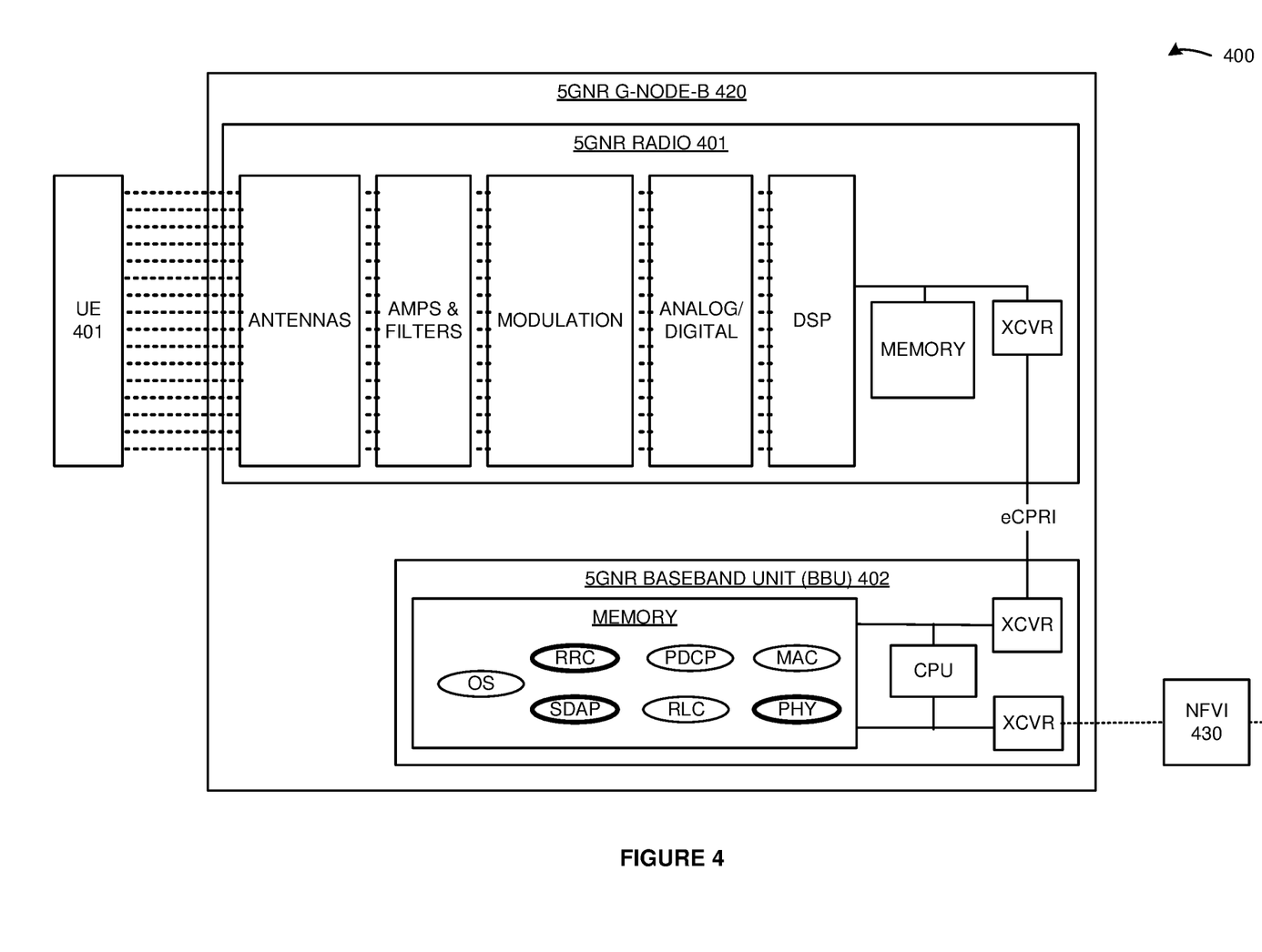
FIG. 4 illustrates a Fifth Generation New Radio (5GNR) gNodeB to control the number of MIMO layers for a 5GNR UE in a Fifth Generation (5G) wireless communication network.

FIG. 4 illustrates Fifth Generation New Radio (5GNR) gNodeB 420 to control the number of MIMO layers for 5GNR UE 401 in Fifth Generation (5G) wireless communication network 400. 5G communication network 400 comprises an example of wireless communication network 100, although network 100 may differ. 5G communication network 400 comprises UE 401, 5GNR gNodeB 420, and Network Function Virtualization Infrastructure (NFVI) 430. 5GNR gNodeB 420 comprises an example of wireless access node 110, although access node 110 may differ. 5GNR gNodeB 420 comprises 5GNR radio 401 and 5GNR BBU 402. 5GNR radio 401 comprises antennas, amplifiers, filters, modulation, analog-to-digital interfaces, DSP, memory, and transceivers that are coupled over bus circuitry. 5GNR BBU 402 comprises memory, CPU, and transceivers that are coupled over bus circuitry. The memory in 5GNR BBU 402 stores an operating system and 5GNR network applications like Physical Layer (PHY), Media Access Control (MAC), Radio Link Control (RLC), Packet Data Convergence Protocol (PDCP), Service Adaptation Application Protocol (SDAP), and Radio Resource Control (RRC).

In this example, UE 401 is wirelessly coupled to the antennas in 5GNR radio 601 over 16 5GNR MIMO layers. A transceiver in 5GNR radio 401 is coupled to a transceiver in 5GNR BBU 402 over enhanced CPRI (eCPRI) links. A transceiver in 5GNR BBU 402 is coupled to NFVI 420 over backhaul links. The CPU in 5GNR BBU 402 executes the operating system, PHY, MAC, RLC, PDCP, SDAP, and RRC to exchange 5GNR signaling and data with UE 401 and to exchange 5G Core (5GC) signaling and data with NFVI 420 and other NodeBs. 5GNR BBU 402 may be physically separated into a Distributed Unit (DU) and a Centralized Unit (CU) that each resemble BBU 402. The CU and DU would each host a portion of the software in BBU 402. The CU and DU would be coupled over transceivers and fronthaul links.

In 5GNR radio 401, the antennas receive wireless 5GNR signals from UEs 401 that transport uplink 5GNR signaling and data. The antennas transfer corresponding electrical uplink signals through duplexers to the amplifiers. The amplifiers boost the received uplink signals for filters which attenuate unwanted energy. Demodulators down-convert the uplink signals from their carrier frequency. The analog/digital interfaces convert the analog uplink signals into digital uplink signals for the DSPs. The DSPs recover uplink symbols from the uplink digital signals. In 5GNR BBU 402, the CPU executes the network applications to process the uplink symbols and recover the uplink signaling and the uplink data. The network applications processes the uplink 5GNR signaling and downlink 5GC signaling to generate new X2 signaling, new uplink 5GC signaling, and new downlink 5GNR signaling. The RRC transfers the new uplink 5GC signaling to NFVI 430 and the X2 signaling to other NodeBs. The SDAP transfers corresponding 5GC data to NFVI 430 and other NodeBs.

In 5GNR BBU 402, the RRC receives the 5GC signaling from NFVI 430 and X2 signaling from other NodeBs. The SDAP receives 5GC data from NFVI 420 and other NodeBs. The 5GNR network applications process the 5GNR signaling and data to generate corresponding downlink symbols that carry the 5GNR signaling and data—including MIMO precoding for the selected number of MIMO layers. In 5GNR radio 401, the DSP processes the downlink symbols to generate corresponding digital MIMO layers for the analog-to-digital interfaces. The analog-to-digital interfaces convert the digital MIMO layers into analog MIMO layers for modulation. Modulation up-converts the analog MIMO layers to their carrier frequency. The amplifiers boost the modulated MIMO layers for the filters which attenuate unwanted out-of-band energy. The filters transfer the filtered MIMO layers through duplexers to the antennas. The electrical MIMO layers drive the antennas to emit corresponding wireless 5GNR MIMO layers to UEs 401 that transport the downlink 5GNR signaling and data.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, channel coding/decoding, channel estimation/equalization, and rate matching/de-matching. Per-layer PHY functions comprise: scrambling/descrambling, modulation mapping/de-mapping, layer mapping/de-mapping, precoding, Resource Element (RE) mapping/de-mapping, Fast Fourier Transforms (FFTs)/Inverse FFTs (IFFTs), and Discrete Fourier Transforms (DFTs)/Inverse DFTs (IDFTs).

In operation, a set of UEs (that not shown for clarity) wirelessly exchange 5GNR data and signaling with 5GNR radio 401. 5GNR radio 401 and 5GNR BBU 402 exchange the 5GNR data and signaling over the eCPRI links. 5GNR BBU 402 and NFVI 430 exchange corresponding 5GC data and signaling over the backhaul links. In 5GNR BBU 402, the SDAP determines average backhaul throughput and notifies the PHY. The MAC determines the wireless downlink error rate for gNodeB 420, determines the MU-MIMO status for UE 401, and notifies the PHY. The RRC determines RRC-Connected UE load and notifies the PHY. The RRC also receives Channel State Information (CSI), emergency status, relay status, and UE capabilities from UE 401 over 5GNR radio 401 and notifies the PHY.

In 5GNR BBU 402, the PHY selects the number of MIMO layers for UE 401 based on the CSI in combination with one or more of the emergency status, relay status, MU-MIMO status, UE capabilities, backhaul status, uplink noise rise, downlink error rate, and RRC-Connected UE load. For example, 5GNR BBU 402 maximizes the number of MIMO layers for the CSI when an emergency status, relay status, MU-MIMO status, 5GNR UE capability, or mmW UE capability is identified. 5GNR BBU 402 reduces the number of MIMO layers for a given CSI when the backhaul quality suffers, the uplink noise rise increases, the downlink error rate increases, and/or the RRC-Connected UE load is excessive. BBU 402 may increase the number of MIMO layers for the given CSI when backhaul quality improves, the uplink noise rise decreases, the downlink error rate decreases, and/or the RRC-Connected UE load normalizes.

In this example, the PHY in 5GNR BBU 402 selects 16 layers for UE 401, although different numbers of MIMO layers are selected for UE 401 over time as conditions change. The PHY in 5GNR BBU 402 precodes the user data and signaling into symbols for the 16 MIMO layers for UE 401. The PHY in 5GNR BBU 402 transfers the 16 layers of precoded data to 5GNR radio 401 over the eCPRI link. 5GNR radio 401 wirelessly transmits the 16 MIMO layers of data to UE 401. The 16 MIMO layers may increase data throughput with spatial multiplexing or improve reliability with transmit diversity.

Figure 5:
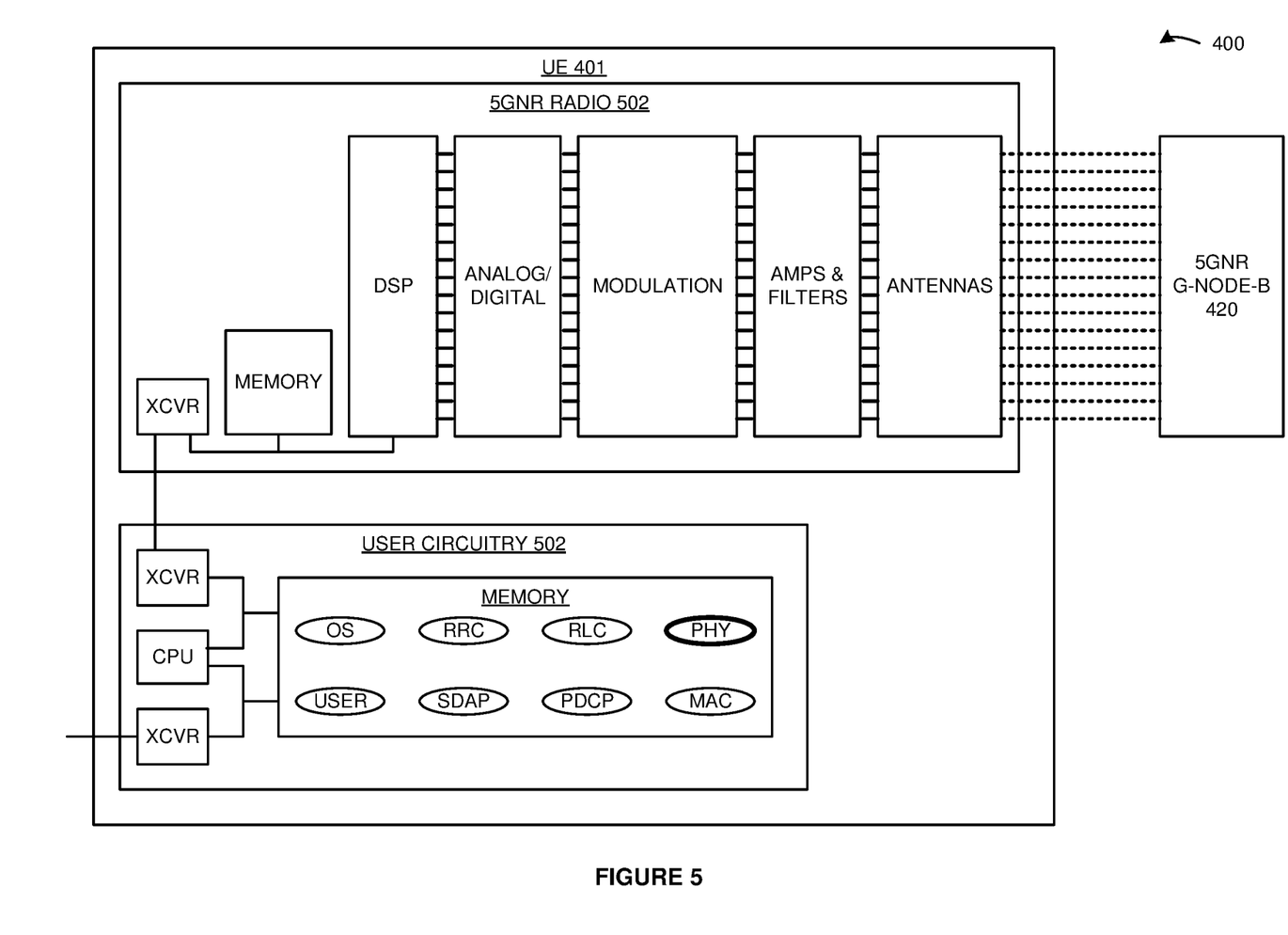
FIG. 5 illustrates the 5GNR UE that has its number of MIMO layers controlled by the 5GNR gNodeB in the 5G wireless communication network.

FIG. 5 illustrates 5GNR UE 401 that has its number of MIMO layers controlled by 5GNR gNodeB 420 in 5G wireless communication network 400. UE 401 comprises an example of UEs 101, although UEs 101 may differ. UE 401 comprises 5GNR radio 501 and user circuitry 502. 5GNR radio 501 comprises antennas, amplifiers, filters, modulation, analog-to-digital interfaces, DSP, memory, and transceivers that are coupled over bus circuitry. User circuitry 502 comprises memory, CPU, and transceivers that are coupled over bus circuitry. The memory in user circuitry 502 stores an operating system, user applications (USER), and 5GNR network applications for PHY, MAC, RLC, PDCP, SDAP, and RRC. The antennas in 5GNR radio 501 are wirelessly coupled to the antennas in 5GNR gNodeB 411—over 16 MIMO layers in this example. A transceiver in 5GNR radio 501 is coupled a transceiver in user circuitry 502. A transceiver in user circuitry 502 is coupled to external user systems. The CPU in user circuitry 502 executes the operating system, PHY, MAC, RLC, PDCP, SDAP, and RRC to exchange 5GNR signaling and data with 5GNR gNodeB 420.

In 5GNR radio 501, the antennas receive wireless signals from 5GNR gNodeB 420 that transport downlink 5GNR signaling and data over the 16 MIMO layers. The antennas transfer corresponding electrical MIMO layers through duplexers to the amplifiers. The amplifiers boost the received MIMO layers for filters which attenuate unwanted energy. Demodulators down-convert the MIMO layers from their carrier frequency. The analog/digital interfaces convert the analog MIMO layers into digital MIMO layers for the DSPs. The DSPs transfer the digital MIMO layers to user circuitry 502 over the transceivers. In user circuitry 502, the CPU executes the network applications to process the MIMO layers and recover the downlink 5GNR signaling and data. The network applications receive new uplink signaling and data from the user applications. The network applications process the uplink user signaling the downlink 5GNR signaling to generate new downlink user signaling and new uplink 5GNR signaling. The network applications transfer the new downlink user signaling to the user applications. The network applications transfer the downlink user data to the user applications.

The network applications process the new uplink 5GNR signaling and user data to generate corresponding uplink 5GNR symbols that carry the uplink 5GNR signaling and data. In radio 501, the DSP processes the uplink symbols to generate corresponding digital signals for the analog-to-digital interfaces. The analog-to-digital interfaces convert the digital uplink signals into analog uplink signals for modulation. Modulation up-converts the uplink signals to their carrier frequency. The amplifiers boost the modulated uplink signals for the filters which attenuate unwanted out-of-band energy. The filters transfer the filtered uplink signals through duplexers to the antennas. The electrical uplink signals drive the antennas to emit corresponding wireless 5GNR signals to 5GNR NodeB 420 that transport the uplink 5GNR signaling and data.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, channel coding/decoding, channel estimation/equalization, and rate matching/de-matching. Per-layer PHY functions comprise: scrambling/descrambling, modulation mapping/de-mapping, layer mapping/de-mapping, precoding, RE mapping/de-mapping, FFTs/IFFTs, and DFTs/IDFTs.

In operation, the PHY in UE 401 determines CSI during channel estimation/equalization. The RRC determines emergency status, relay status, and UE capabilities. The RRC reports the CSI, emergency status, relay status, and UE capabilities to 5GNR gNodeB 420. The PHY receives and isolates the received 5GNR signaling and data into the 16 MIMO layers. The PHY soft-combines layers for transmit diversity and demultiplexes layers for spatial multiplexing. The PHY may also support MU-MIMO where the PHY shares individual 5GNR resource blocks and the MIMO layers in the individual blocks with other UEs.

Figure 6:
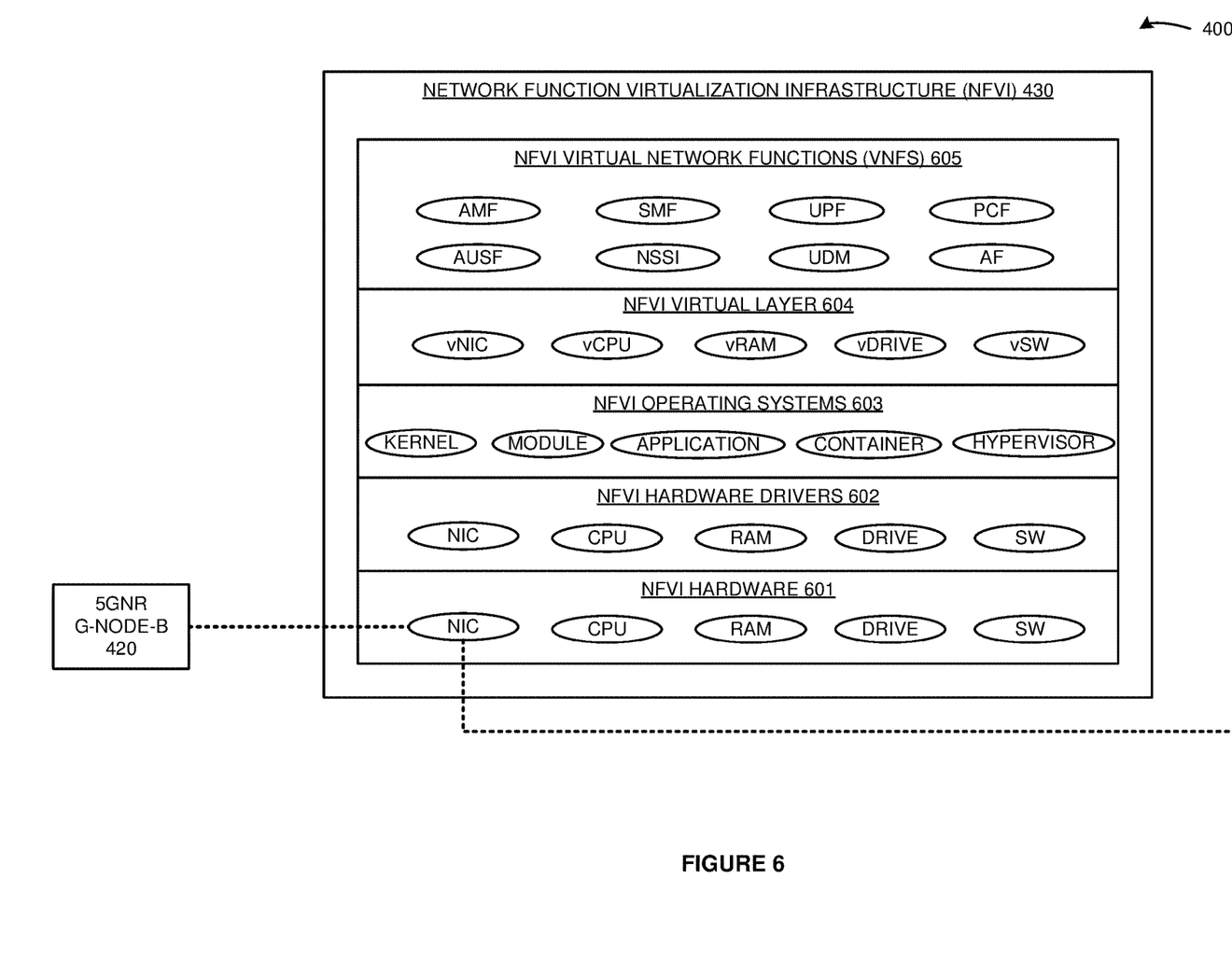
FIG. 6 illustrates a Network Function Virtualization Infrastructure that serves the 5GNR UE over the 5GNR gNodeB in the 5G wireless communication network.

FIG. 6 illustrates Network Function Virtualization Infrastructure (NFVI) 430 that serves 5GNR UE 401 over 5GNR gNodeB 420 in 5G wireless communication network 400. NFVI 430 comprises an example of network elements 130, although network elements 130 may differ. NFVI 430 comprises NFVI hardware 601, NFVI hardware drivers 602, NFVI operating systems 603, NFVI virtual layer 604, and NFVI Virtual Network Functions (VNFs) 605. NFVI hardware 601 comprises Network Interface Cards (NIC), CPU, RAM, flash/disk drives, and data switches (SW). NFVI hardware drivers 602 comprise software that is resident in the NIC, CPU, RAM, DRIVE, and SW. NFVI operating systems 603 comprise kernels, modules, applications, containers, hypervisors, and the like. NFVI virtual layer 604 comprises virtual NICs (vNIC), virtual CPUs (vCPU), virtual RAM (vRAM), virtual Drives (vDRIVE), and virtual Switches (vSW). NFVI VNFs 605 comprise Access and Mobility Management Functions (AMF), Session Management Functions (SMF), User Plane Functions (UPF), Policy Control Functions (PCF), Authentication and Security Functions (AUSF), Network Slice Selection Functions (NSSF), User Data Management Functions (UDM), and Application Functions (AF). Other VNFs are typically present but are omitted for clarity. The NIC are coupled to 5GNR gNodeB 420 and external systems. NFVI hardware 601 executes NFVI hardware drivers 602, NFVI operating systems 603, NFVI virtual layer 604, and NFVI VNFs 605 to serve UE 401 over 5GNR gNodeB 420.

Figure 7:
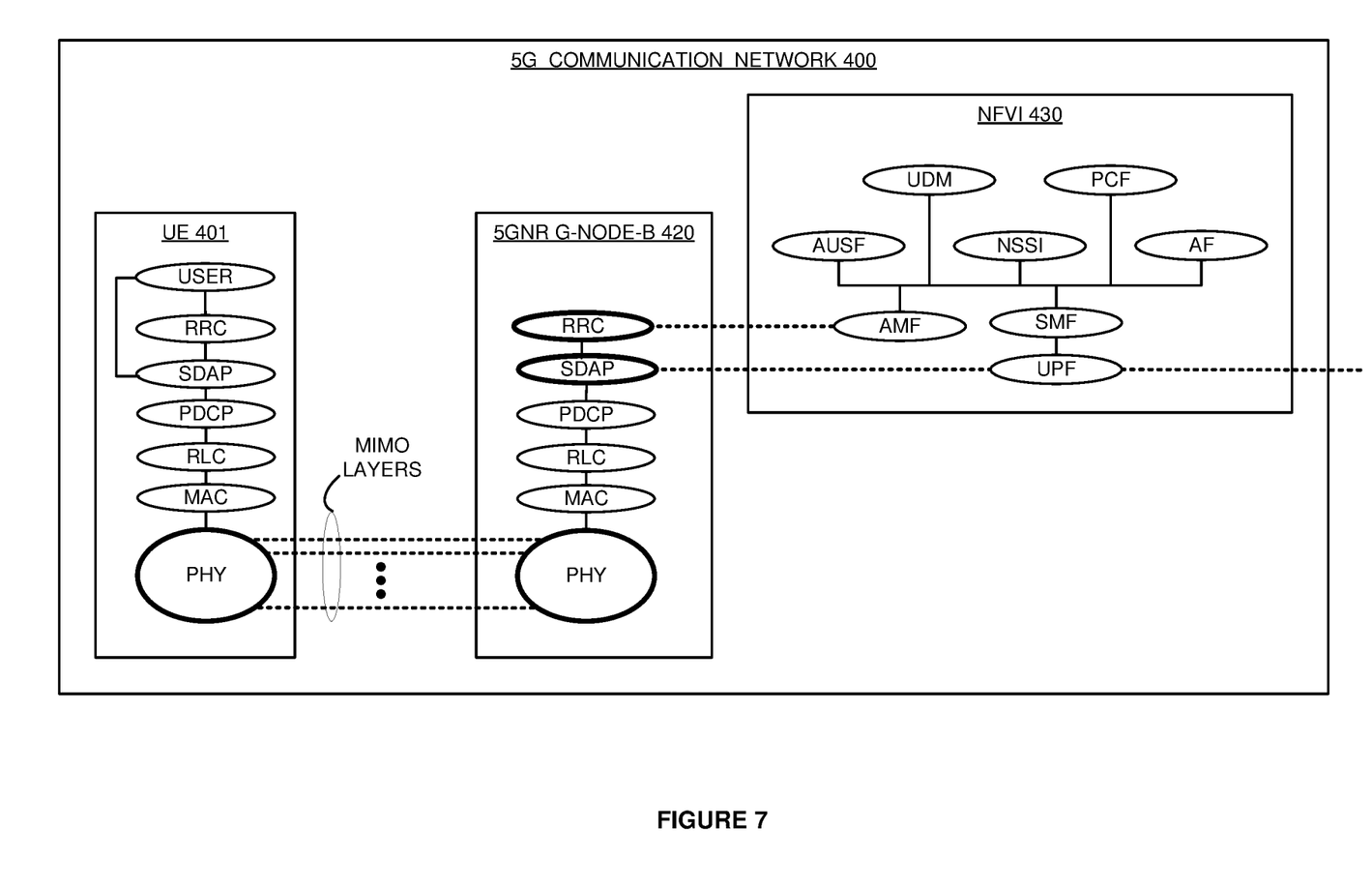
FIG. 7 illustrates an exemplary operation of the 5G wireless communication network to control the number of MIMO layers from the 5GNR gNodeB to the 5GNR UE.

FIG. 7 illustrates an exemplary operation of 5G wireless communication network 400 to control the number of MIMO layers from 5GNR gNodeB 420 to 5GNR UE 401. The illustrated operation is exemplary and may vary from FIG. 7 in other examples. The 5GNR RRC in UE 401 attaches to the 5GNR RRC in 5GNR gNodeB 420. The 5GNR RRC in gNodeB 420 exchanges 5GC signaling with the AMF in NFVI 430. The AMF interacts with the AUSF and UDM to authenticate and authorize UE 401 for services. The AMF interacts with the NSSI, SMF, and PCF to select QoS, network addressing, and the like for UE 401. The SMF directs a UPF to serve UE 401 over 5GNR gNodeB 420. The AMF signals the RRC in 5GNR gNodeB 420 to serve UE 401 per the QoS and network addresses. The RRC in 5GNR gNodeB 420 signals the RRC in UE 401 indicating the selected services, QoS, and network addresses. The user applications in UE 401 exchange user signaling with the RRC over the operating system and exchange user data with the SDAP over the operating system. The RRC in UE 401 and the RRC in 5GNR gNodeB 420 exchange 5GNR signaling to establish the selected services per the QoS. The SDAP in UE 401 and the SDAP in 5GNR gNodeB 420 exchange the user data to deliver the selected services per the QoS. The SDAP in 5GNR gNodeB 420 and the UPF in NFVI 430 exchange the user data to deliver the selected services per the QoS. The UPF in NFVI 430 and external systems exchange the user data to deliver the selected services per the QoS The PHY in UE 401 determines CSI during channel estimation/equalization. The RRC in UE 401 determines emergency status, relay status, and UE capabilities. The RRC in UE 401 reports the CSI, emergency status, relay status, and UE capabilities to the RRC in 5GNR gNodeB 420. In 5GNR gNodeB 420, the SDAP determines average backhaul throughput and notifies the PHY. The MAC determines the downlink Block Error Rate (BLER) for gNodeB 420, determines the MU-MIMO status for UE 401, and notifies the PHY. The RRC determines RRC-Connected UE load and notifies the PHY. The RRC also receives the CSI, emergency status, relay status, and UE capabilities from UE 401 and notifies the PHY.

In 5GNR gNodeB 420, the PHY selects the number of MIMO layers for UE 401 based on the CSI in combination with one or more of the emergency status, relay status, MU-MIMO status, UE capabilities, backhaul status, uplink noise rise, downlink BLER, and RRC-Connected UE load. For example, UE 401 may be engaged in a non-emergency and non-relay data session when using a 5GNR UE capability—and UE 401 is not using MU-MIMO at the time. The PHY in 5GNR gNodeB 420 selects an initial number of MIMO layers based on the CSI and the 5GNR UE capability—perhaps through a data translation. The PHY reduces the initial number of MIMO layers based on poor backhaul quality, bad uplink noise rise, the high downlink error rate, or excessive RRC-Connected UE load. For example, the PHY may translate the initial number of layers and the current uplink noise rise into a lower number of layers. The PHY may translate the initial number of layers and a heavy RRC-Connected UE load into a lower number of layers.

In this example, the PHY in 5GNR gNodeB 420 selects 16 layers for UE 401, although different numbers of MIMO layers are selected for UE 401 over time as conditions change. The PHY in 5GNR gNodeB 420 precodes the user data and signaling into the 16 MIMO layers for UE 401. The PHY in 5GNR gNodeB 420 transfers the 16 MIMO layers of precoded data to the PHY in UE 401. The PHY in UE 401 processes the precoded data to isolate and recover the 16 different layers of data and signaling. The 16 MIMO layers may be used to increase data throughput with spatial multiplexing and/or improve reliability with transmit diversity. The PHY soft-combines layers for transmit diversity and demultiplexes layers for spatial multiplexing. If MU-MIMO were in use, the PHY would only use some of the MIMO layers in the individual 5GNR resource blocks and allow PHYs in other UEs to use the other MIMO layers in the same 5GNR resource blocks.

The wireless data network circuitry described above comprises computer hardware and software that form special-purpose network circuitry to control the number of MIMO layers that are used to wirelessly serve UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to control the number of MIMO layers that are used to wirelessly serve UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to control Multiple Input Multiple Output (MIMO) layers for an individual User Equipment (UE), the method comprising:
   a radio wirelessly exchanging user data with other User Equipment (UEs) and exchanging the user data with baseband circuitry;
   the baseband circuitry exchanging the user data with the radio, exchanging the user data with one or more network elements over at least one backhaul link, determining a backhaul status of the at least one backhaul link, identifying radio band status for the individual UE, receiving additional data for the individual UE from the one or more network elements over the at least one backhaul link, selecting a number of the MIMO layers for the individual UE based on the radio band status and the backhaul status, precoding the additional data into precoded data for the selected number of MIMO layers, and transferring the precoded data to the radio; and
   the radio receiving the precoded data from the baseband circuitry and wirelessly transmitting the precoded data to the individual UE over the selected number of MIMO layers.

2. The method of claim 1 further comprising the baseband circuitry determining a Multiple User MIMO (MU-MIMO) status for the UE and wherein the baseband circuitry selecting the number of the MIMO layers for the individual UE comprises selecting the number of the MIMO layers based on the radio band status, the backhaul status, and the MU-MIMO status.

3. The method of claim 1 further comprising the baseband circuitry determining an uplink noise rise at the radio and wherein the baseband circuitry selecting the number of the MIMO layers for the individual UE comprises selecting the number of the MIMO layers based on the radio band status, the backhaul status, and the uplink noise rise.

4. The method of claim 1 further comprising the baseband circuitry determining an emergency status for the individual UE and wherein the baseband circuitry selecting the number of the MIMO layers for the individual UE comprises selecting the number of the MIMO layers based on the radio band status, the backhaul status, and the emergency status.

5. The method of claim 1 further comprising the baseband circuitry determining a UE capability for the individual UE and wherein the baseband circuitry selecting the number of the MIMO layers for the individual UE comprises selecting the number of the MIMO layers based on the radio band status, the backhaul status, and the UE capability.

6. The method of claim 1 further comprising the baseband circuitry determining a relay type for the individual UE and wherein the baseband circuitry selecting the number of the MIMO layers for the individual UE comprises selecting the number of the MIMO layers based on the radio band status, the backhaul status, and the relay type.

7. The method of claim 1 further comprising the baseband circuitry determining a mobility factor for the individual UE and wherein the baseband circuitry selecting the number of the MIMO layers for the individual UE comprises selecting the number of the MIMO layers based on the radio band status, the backhaul status, and the mobility factor.

8. The method of claim 1 further comprising the baseband circuitry determining downlink error rate for the wireless access node and wherein the baseband circuitry selecting the number of the MIMO layers for the individual UE comprises selecting the number of the MIMO layers based on the radio band status, the backhaul status, and the downlink error rate.

9. The method of claim 1 further comprising the baseband circuitry determining an amount of the other UEs that are Radio Resource Control (RRC) Connected to the baseband circuitry and wherein the baseband circuitry selecting the number of the MIMO layers for the individual UE comprises selecting the number of the MIMO layers based on the radio band status, the backhaul status, and the amount of the other UEs that are RRC Connected to the baseband circuitry.

10. The method of claim 1 wherein:
    the radio comprises a Fifth Generation New Radio (5GNR) radio; and
    the baseband circuitry comprises Long Term Evolution (LTE) baseband circuitry.

11. A wireless access node to control Multiple Input Multiple Output (MIMO) layers for an individual User Equipment (UE), the wireless access node comprising:
    a radio configured to wirelessly exchange user data with other User Equipment (UEs) and exchange the user data with baseband circuitry;
    the baseband circuitry configured to exchange the user data with the radio, exchange the user data with one or more network elements over at least one backhaul link, determine a backhaul status of the at least one backhaul link, identify radio band status for the individual UE, receive additional data for the individual UE from the one or more network elements over the at least one backhaul link, select a number of the MIMO layers for the individual UE based on the radio band status and the backhaul status, precode the additional data into precoded data for the selected number of MIMO layers, and transfer the precoded data to the radio; and
    the radio configured to receive the precoded data from the baseband circuitry and wirelessly transmit the precoded data to the individual UE over the selected number of MIMO layers.

12. The wireless access node of claim 11 further comprising the baseband circuitry configured to determine a Multiple User MIMO (MU-MIMO) status for the UE and select the number of the MIMO layers based on the radio band status, the backhaul status, and the MU-MIMO status.

13. The wireless access node of claim 11 further comprising the baseband circuitry configured to determine an uplink noise rise at the radio and select the number of the MIMO layers based on the radio band status, the backhaul status, and the uplink noise rise.

14. The wireless access node of claim 11 further comprising the baseband circuitry configured to determine an emergency status for the individual UE and select the number of the MIMO layers based on the radio band status, the backhaul status, and the emergency status.

15. The wireless access node of claim 11 further comprising the baseband circuitry configured to determine a UE capability for the individual UE and select the number of the MIMO layers based on the radio band status, the backhaul status, and the UE capability.

16. The wireless access node of claim 11 further comprising the baseband circuitry configured to determine a relay type for the individual UE and select the number of the MIMO layers based on the radio band status, the backhaul status, and the relay type.

17. The wireless access node of claim 11 further comprising the baseband circuitry configured to determine a mobility factor for the individual UE and select the number of the MIMO layers based on the radio band status, the backhaul status, and the mobility factor.

18. The wireless access node of claim 11 further comprising the baseband circuitry configured to determine downlink error rate for the wireless access node and select the number of the MIMO layers based on the radio band status, the backhaul status, and the downlink error rate.

19. The wireless access node of claim 11 further comprising the baseband circuitry configured to determine an amount of the other UEs that are Radio Resource Control (RRC) Connected to the baseband circuitry and select the number of the MIMO layers based on the radio band status, the backhaul status, and the amount of the other UEs that are RRC Connected to the baseband circuitry.

20. The wireless access node of claim 11 wherein:
- the radio comprises a Fifth Generation New Radio (5GNR) radio; and
- the baseband circuitry comprises Long Term Evolution (LTE) baseband circuitry.

\* \* \* \* \*